United States Patent [19]
Eitel et al.

[11] Patent Number: 4,657,361
[45] Date of Patent: Apr. 14, 1987

[54] MIRROR MOUNTING ARRANGEMENT

[75] Inventors: Frederick G. Eitel, North Palm Beach; Robert G. Jaeger, Palm Beach Gardens, both of Fla.

[73] Assignee: United Technologies Corporation, Hartford, Conn.

[21] Appl. No.: 711,778

[22] Filed: Mar. 14, 1985

[51] Int. Cl.⁴ .............................. G02B 5/08; G02B 7/18
[52] U.S. Cl. ..................................... 350/633; 248/476; 248/562; 248/575; 248/636; 350/632
[58] Field of Search ........................ 350/631–634, 350/636, 637, 639; 248/562, 636, 638, 466, 573–575, 475.1, 476, 477, 479, 487, 560

[56] References Cited
U.S. PATENT DOCUMENTS

| | | | |
|---|---|---|---|
| 2,412,838 | 12/1946 | Shores | 248/573 |
| 3,313,077 | 4/1967 | Fuqua | 248/476 |
| 3,404,352 | 10/1968 | Bowness | 350/633 X |
| 3,565,386 | 2/1971 | Lemkuil et al. | 248/573 |
| 3,897,139 | 7/1975 | Caruolo et al. | 350/633 |
| 3,952,980 | 4/1976 | von Pragenau et al. | 248/636 |
| 3,953,113 | 4/1976 | Shull | 248/476 X |
| 4,060,314 | 11/1977 | Heinz | 350/633 X |
| 4,060,315 | 11/1977 | Heinz | 350/636 |
| 4,171,873 | 10/1979 | Repay et al. | 350/634 |
| 4,278,726 | 7/1981 | Wieme | 248/638 X |
| 4,522,365 | 6/1985 | Tabares | 248/466 |

Primary Examiner—John Petrakes
Attorney, Agent, or Firm—John Swiatocha

[57] ABSTRACT

Viscoelastic damping material (45, 80 and 105) effectively damps the resonant responses of a mirror (10) and a mount (12) therefor to vibratory disturbances thereof by such phenomena as pressure pulses in a pulsed chemical laser cavity.

11 Claims, 6 Drawing Figures

UNDAMPED TRANSFER FUNCTION

DAMPED MIRROR TRANSFER FUNCTION

ACCELEROMETER TIME HISTORY

ACCELEROMETER TIME HISTORY

MIRROR MOUNTING ARRANGEMENT

The U.S. Government has rights in this invention pursuant to Contract No. N00014-81-C-2604 awarded by the Department of the Navy.

TECHNICAL FIELD

This invention relates to mirror mounting arrangements for such optical systems as pulsed chemical laser systems.

BACKGROUND ART

Those skilled in the optical arts will readily appreciate that for enhanced light beam quality and enhanced accuracy in beam orientation, a mirror reflecting such a beam must be mounted so that the effects of vibratory disturbances on the mirror are minimized. The minimization of such vibratory effects is particularly critical in laser systems such as a pulsed chemical lasers.

In a pulsed chemical laser, laser light energy is generated by periodic chemical reactions in a resonator chamber having mirrors therein which repeatedly reflect a light energy beam for a resonant reinforcement thereof. The chemical reactions are to a certain extent, explosive in nature, occurring at periodic rates of typically from 50-100 cycles per second and producing light pulses at such frequencies. Each pulse of light energy (typically, of a duration of approximately 2.0 microseconds) is followed by a pressure pulse (from the explosion which produces that light pulse) of an amplitude of, for example, 5.0 atmospheres and a duration of, for example, 2.0 milliseconds. The pressure pulses when impinging on the mirrors and/or mounts therefor, produce significant dynamic responses in the mirrors and mounts at the resonant frequencies thereof. It will be appreciated that such dynamic responses, unless damped within a matter of a few milliseconds, will adversely affect the reflection of subsequent pulses of light energy, causing excessive output beam jitter and poor beam quality. Heretofore, the magnitude and frequency of the pressure pulses have made the effective damping thereof, difficult if not impossible to attain.

DISCLOSURE OF INVENTION

It is therefore a prinicpal object of the present invention to provide a mirror mounting arrangement for such optical systems as pulsed chemical lasers.

It is a further object of the present invention to provide such a mirror mounting arrangement which effectively damps the dynamic responses of the mirror and mount therefor to disturbances thereof from such phenomena as pressure pulses in a pulsed chemical laser.

These and other objects, which will become more readily apparent from the following detailed description taken in connection with the appended claims and accompanying drawing, are attained in the present invention by the disposition of thin layers of a viscoelastic material between a mirror and the mount therefor, the material dissipating vibrations in the mirror and mount by shear damping. The mirror is fixed to the mount by fastening means which firmly holds the mirror and mount together while limiting the force at which the viscoelastic damping material is compressed between the mirror and mount. In the preferred embodiment, a first layer of viscoelastic material is disposed between the mirror and a constraining plate to which the mirror is attached by fasteners such as bolts or the like. The fasteners carry resilient means such as belleville washers or the like which compress under the load applied thereto by the fasteners whose penetration into the constraining plate and/or mirror, is limited, thereby limiting the compression of the resilient means and the viscoelastic material. The fasteners may comprise shoulder bolts which apply a predetermined loading to the belleville washers when the shoulders seat against the mirror back. The mirror may be provided with a rearwardly extending circumferential flange about which a second layer of viscoelastic material is disposed. Radial bolts or the like fix a mounting ring to the flange, compressively restraining the viscoelastic damping material thereagainst. The mutual, perpendicular orientation between the two layers of material provide shear damping in two orthogonal planes of vibrations both normal and parallel to the mirror's reflecting surface. The circumferential flange may be provided with an annular shoulder to which a stiff rear plate is attached for isolating the mirror, constraining plate and mounting ring from the effects of differential thermal growth between the rear plate and any structure (such as a resonator wall) on which the mirror and mount are supported. A third layer of viscoelastic damping material may be compressively held between the annular shoulder and rear plate for further damping of dynamic responses of the mirror and mount to vibratory disturbance thereof.

BEST MODE FOR CARRYING OUT THE INVENTION AND INDUSTRIAL APPLICABILITY THEREOF

Figure 1:
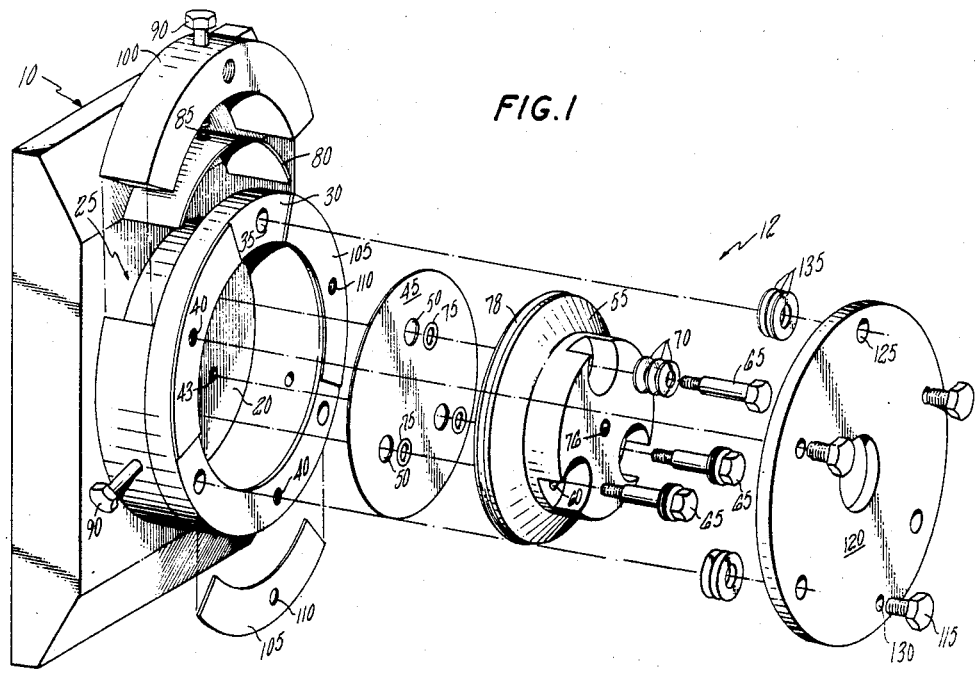
FIG. 1 is an exploded isometric view of the mirror mounting arrangement of the present invention.
Figure 2:
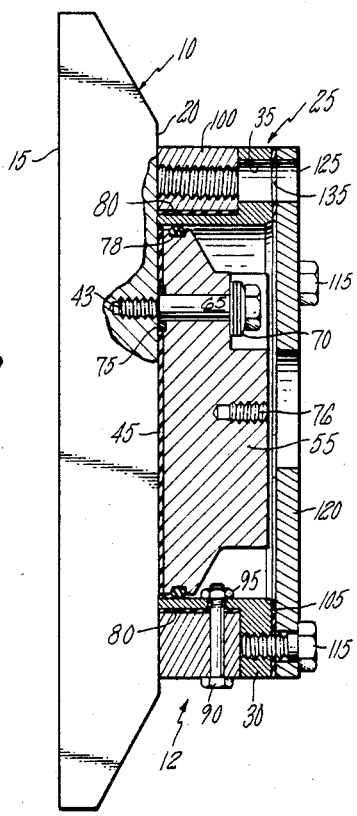
FIG. 2 is a partially sectioned, side elevation of the mirror mounting arrangement of the present invention.

Referring to FIGS. 1 and 2, a mirror for an optical system such as a pulsed chemical laser is shown at 10 and a mount therefor at 12, the mirror including a front reflective surface 15 and a flat back surface 20. Mirror 10 is formed from any known, suitable material such as various known glasses or metals. Reflective surface 15 may be ground and polished to any desired contour. Back surface 20 has a rearwardly extending cylindrical flange 25 fixed thereto by any suitable technique which is determined by the composition of the mirror and flange. For example, where the mirror is formed from metallic materials, the flange may be fixed to the mirror by such techniques as welding, brazing or other fusion bonding methods. As shown, cylindrical flange 25 is provided with an annular shoulder portion 30 drilled at various locations 35 and 40 thereon. The back surface of the mirror is drilled at locations 43 thereon.

A thin (0.001–0.010 inch) layer of viscoelastic damping material is adhesively bonded to the back surface 20 of mirror 10 within the interior of flange 25. As used herein, the term viscoelastic material means a material such as ISD-110 sold by Minnesota Mining and Manufacturing Company which exhibits both viscous and delayed elastic responses to stress in addition to instantaneous elasticity. As illustrated, viscoelastic layer 45 is apertured at various locations 50 thereon.

A relatively massive constraining plate 55, drilled at a plurality of locations 60 therearound, is bolted at locations 43 to the back of the mirror by shoulder bolts 65, each carrying a plurality of belleville washers 70 thereon. As shown, bolts 65 extend through apertures 50 in viscoelastic layer 45, O-ring seals 75 received within apertures 50 sealing and protecting the viscoelastic material from the environment. The center of constraining plate 55 may include an apertured hole 76 therein to receive assembly and/or adjustment tooling. Viscoelastic material 45 is sealed from contamination by O-ring seal 78 carried by plate 55 and disposed between the plate and the inner surface of flange 25.

The outer surface of cylindrical flange 25, forwardly of shoulder 30, is covered with thin viscoelastic damping material sheets 80, bonded to the shoulder portion and apertured at 85 to receive bolts 90 therethrough. Bolts 90, with mating nuts 95, attach curved mounting ring segments 100 to the outer surface of cylindrical flange 25 and compressively restrain sheets 80 thereagainst. A plurality of curved sheets of viscoelastic damping material 105 apertured at 110 are bonded to the rear face of annular shoulder 30 and held compressively thereagainst by rear plate 120 apertured at locations 125 and 130 thereon and attached to annular shoulder 30 by screws 115 received within apertures 130 and apertures 40 in the shoulder. Rear plate 120 isolates the mirror and the remainder of the mounting structure therefor from the effects of differential thermal growth between the plate and that portion of the optical system (not shown) to which the mirror and mounting structure are attached. Apertures 125 receive fasteners (not shown) which mount the mirror and mounting structure to the remainder of the optical system. One or more shims 135 are captured between plate 120 and the back of shoulder 30 to prevent excessive compressive distortion of viscoelastic layers 105 by the attachment of rear plate 120 to the annular shoulder.

From the foregoing, it will be noted that disturbances such as pressure pulses are damped by viscoelastic layers 45, 80 and 105. The mutual perpendicular orientation between the various viscoelastic layers provides shear damping in two orthogonal planes of dynamic responses of the mirror and mount to distrubances such as pressure pulses. It will also be noted that the shoulder bolts and belleville washers provide a controlled compressive retainment of viscoelastic layer 45 to prevent unwanted creep thereof due to the compressive forces thereo from attachment of plate 55 to the back of mirror 10. As best seen in FIG. 2, as bolts 65 are tightened, belleville washers 70 compress, thereby applying a controlled compressive load to the mirror and constraining plate 55 and hence, the viscoelastic layer therebetween. When the shoulders on bolts 65 seats against the back of mirror 10, no further compression of belleville washers 70 results, and the compressive load on viscoelastic layer 45 is limited to that applied through belleville washers 70 by bolt 65.

Figure 3:
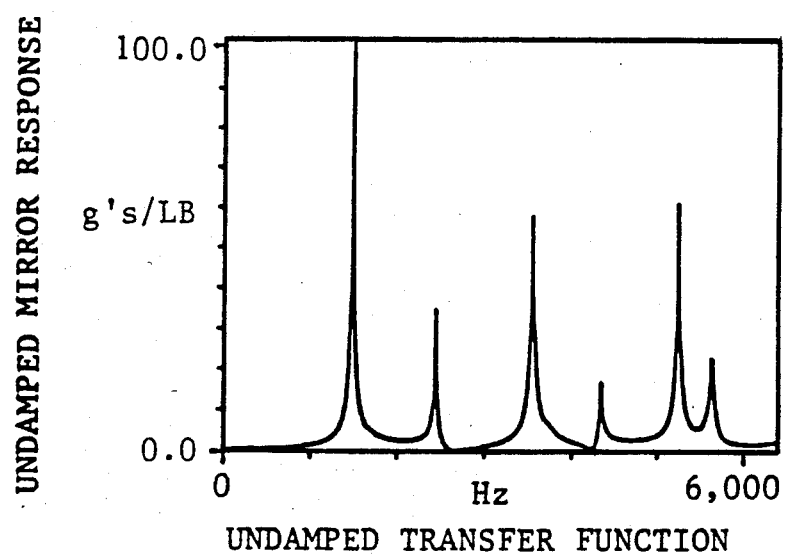
FIG. 3 is a frequency response curve of an undamped mirror mounting arrangement tested under conditions simulating the operation of a pulsed chemical laser.
Figure 4:
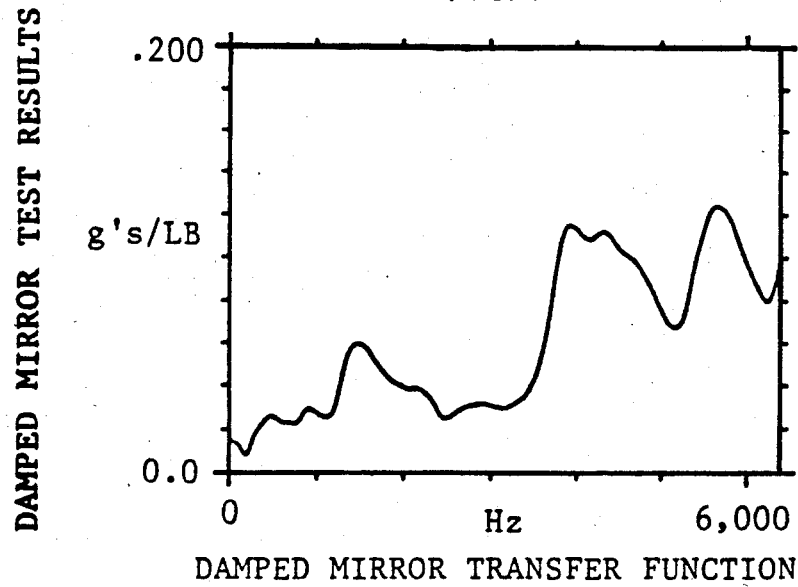
FIG. 4 is a frequency response curve similar to FIG. 3, but for the mirror mounting arrangement of the present invention.
Figure 5:
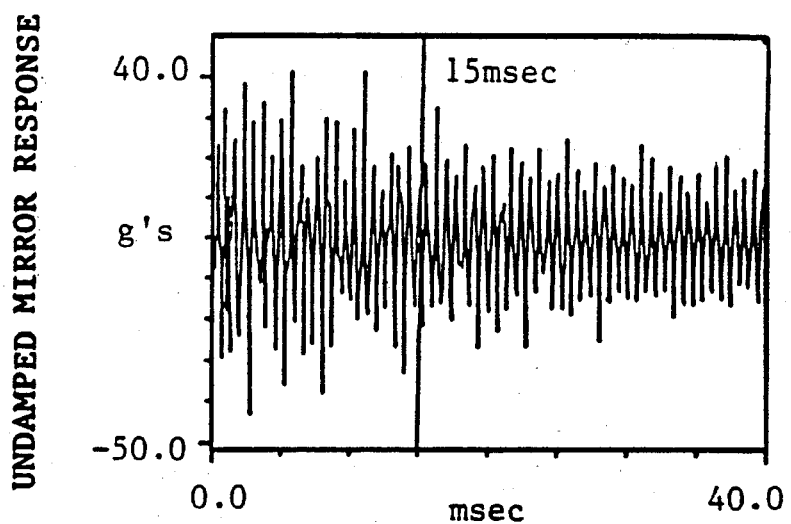
FIG. 5 is an accelerator time history plot of the undamped mirror mounting arrangement under the test conditions noted with respect to FIG. 3.
Figure 6:
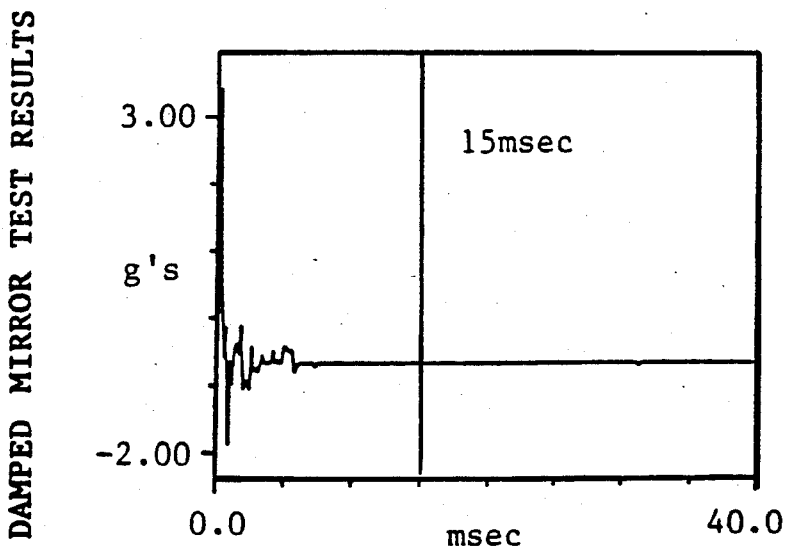
FIG. 6 is an accelerator time history plot similar to FIG. 5, but for the mirror mounting arrangement of the present invention.

FIG. 3 graphically depicts the frequency response of a mirror and mount similar to that shown in FIG. 1, but without viscoelastic damping, to disturbances such as those encountered in a pulsed chemical laser. It is seen from FIG. 3 that dynamic responses of extremely high magnitudes are encountered at various resonant frequencies of the mirror and mount. However, as shown in FIG. 4, the viscoelastic material significantly flattens the frequency response of the mirror and mount to the disturbances by several orders of magnitude. FIG. 5 is a graphical representation of an accelerometer time history of the undamped mirror and mount to a disturbance such as a pressure pulse applied thereto from a pulsed chemical laser. As set forth hereinabove, in order for the dynamic response of a mirror and mount to a pressure pulse not to adversely effect the reflection of the next succeeding light pulse, the pressure pulse must be substantially damped in approximately 15 milliseconds or less. As shown in FIG. 5, without the viscoelastic damping material, the dynamic response to a pressure pulse is substantially undamped 15 milliseconds after impingement of the pulse on the structure. However, as shown in FIG. 6, when the mirror and mount are damped with a viscoelastic material in the manner of the present invention, the dynamic response of the mirror and mount are significantly damped in substantially less time than the allowable 15 millisecond interval.

It is thus apparent that in the mirror mounting arrangement of the present invention, disturbances such as pressure pulses encountered in a lasing cavity of a pulsed chemical laser are effectively damped for enhanced light beam quality. Such damping is achieved with very thin layers of viscoelastic material which is easily applied to various components of the mirror mounting arrangement and may therefore be ideally suited for providing damping in known, mirror mounting arrangements.

While a specific embodiment of the present invention has been illustrated, it will be appreciated that various modifications thereof may be suggested by the disclosure herein to those skilled in the art and it is intended by the following claims to cover such modifications as fall within the true spirit and scope of this invention.

Having thus described the invention, what is claimed is:

1. In an optical system comprising a mirror subject to vibratory disturbances thereon and means for mounting said mirror to a structure, the improvement characterized by:
   a thin layer of viscoelastic damping material disposed between said mirror and mounting means for damping said vibratory disturbance; and
   means for positively attaching said mirror to said mounting means while limiting the compressive loading of said viscoelastic damping material resulting from said attachment, thereby reducing the risk of creep of said viscoelastic damping material.

2. The optical system of claim 1 characterized by said mounting means comprising a constraining plate and said attaching means comprising a fastener received within said constraining plate and, to a limited extent of penetration, within the back of said mirror.

3. The optical system of claim 2 characterized by a seal disposed between said mirror and said constraining plate for sealing said viscoelastic damping material from ambient contamination.

4. The optical system of claim 1 characterized by said attaching means including a fastener and resilient means carried thereby which provide said limited loading of said viscoelastic damping material.

5. The optical system of claim 4 characterized by said mounting means comprising a constraining plate, said fastener comprising a bolt and said resilient means comprising at least one belleville spring carried by said bolt and compressed between a back surface of said mirror and said plate.

6. The optical system of claim 1 characterized by said viscoelastic damping layer being of a thickness of from 0.001 to 0.010 inch.

7. The optical system of claim 1 characterized by said mirror including a generally cylindrical flange extending rearwardly from the back of said mirror and said mounting means comprising a generally annular mounting ring fixed thereto and compressively restraining said viscoelastic damping material thereagainst.

8. The optical system of claim 7 characterized by said mounting ring comprising a plurality of segments fixed to said cylindrical flange by radially oriented fasteners received within said mounting ring and said cylindrical flange.

9. The optical system of claim 7 characterized by said cylindrical flange including at an edge thereof, an annular shoulder portion, said mounting means further comprising a stiff rear mounting plate attached to said shoulder portion for isolating said mounting ring and cylindrical flange from differential thermal expansion between said mounting plate and those portions of said optical system to which said mirror and mounting means are fixed.

10. The optical system of claim 9 characterized by a thin layer of said viscoelastic damping material disposed between said rear plate and said annular shoulder portion.

11. The optical system of claim 10 characterized by fasteners which fix said rear mounting plate to said annular shoulder portion and compressively restrain said viscoelastic damping material therebetween.

* * * * *